Jan. 20, 1942. C. G. OLSON 2,270,813
PREASSEMBLED SCREW AND LOCK WASHER UNIT
Filed Dec. 30, 1939
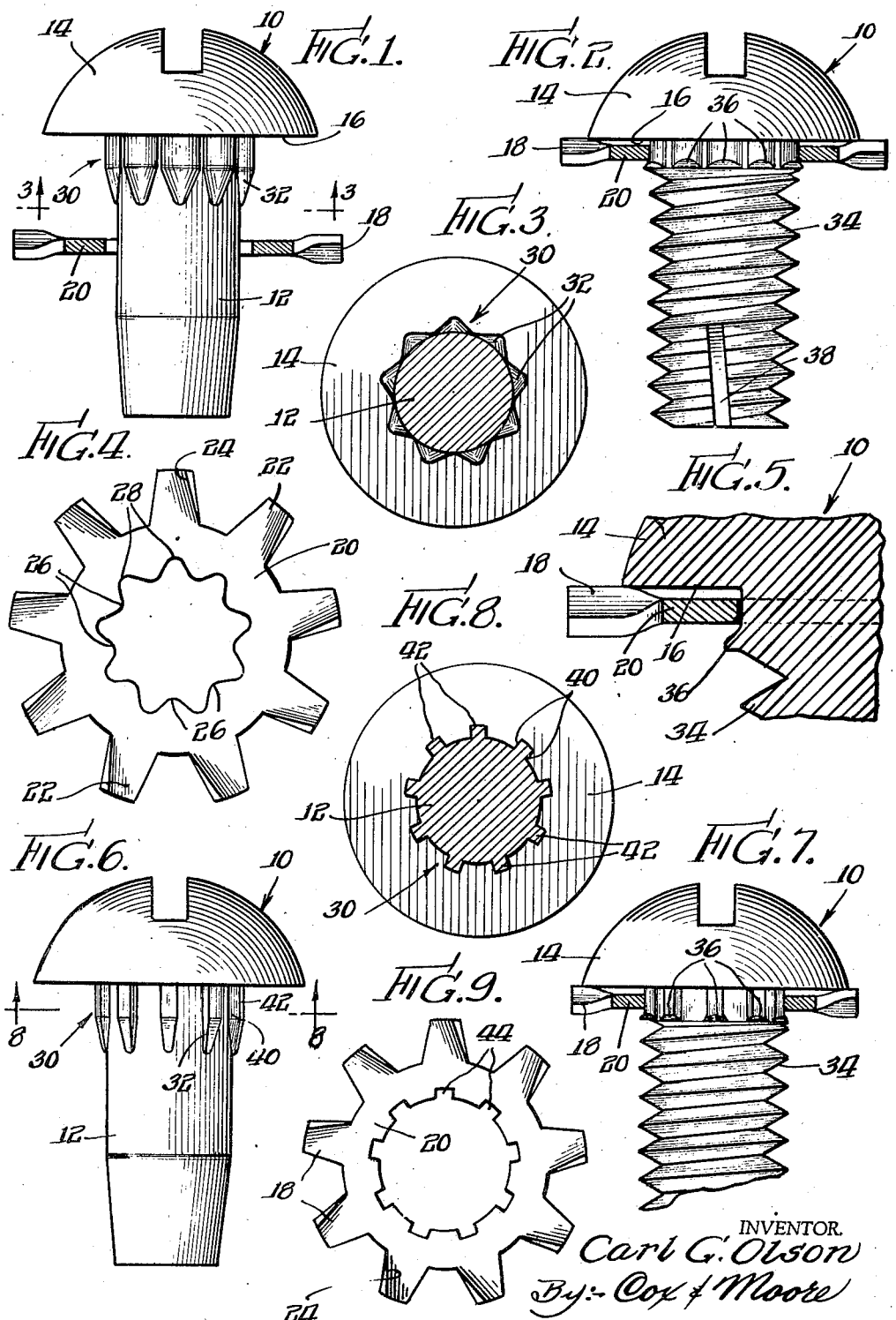

Patented Jan. 20, 1942

2,270,813

UNITED STATES PATENT OFFICE 2,270,813

PREASSEMBLED SCREW AND LOCK WASHER UNIT

Carl G. Olson, Chicago, Ill., assignor to Illinois Tool Works, Chicago, Ill., a corporation of Illinois Application December 30, 1939, Serial No. 311,871

19 Claims. (Cl. 10—10)

The present invention relates to fastener units and more particularly to fastener units of the type wherein a lock washer is secured in operative preassembled relation with respect to the clamping surface of a rotary threaded fastener.

The permanent preassembly of lock washers and fasteners prior to use contributes materially to the facility with which the fasteners may be ultimately applied to the work. The present invention accordingly contemplates the association of the threaded fastener and lock washer in permanently preassembled relationship, and in particular the effectuation of permanent assembly as an incident to the thread-forming operation.

Yet more particularly, the present invention contemplates interassociation of the washer and fastener for permanently resisting relative rotative movement. In many of the ordinary screw and washer assemblies, with which I am familiar, such relative rotation of the parts is unresisted. Where the outer diameter of the washer is greater or substantially greater than the diameter of the fastener head, it is inconvenient for the workman to grasp the head for initial turning or starting of the fastener. In the present mass production industries, such an inconvenience may and frequently does become a major problem.

Relative rotation of the parts comprising the preassembly has, moreover, been a disadvantage in the case of assemblies comprising hardened or thread-forming fasteners which, as a result of the hardness of the clamping surfaces, are not adaptable for interlocking association with the locking teeth of the washer.

It is accordingly an important object of the present invention to provide a preassembly, as above, permanently joined against axial, as well as rotational, displacement as an incident to the formation of the fastener threads.

It is yet more particularly an object of the present invention to provide a permanently interassociated assembly, as above, wherein the fastener has a washer-receiving portion which is peripherally or annularly irregular, as by the provision of spaced, outwardly extending ribs or splines, and wherein the washer has a complementary, inner peripheral configuration, the inner periphery extending radially inwardly sufficiently beyond the crest of material extruded by the thread-forming process to prevent relative axial displacement.

A yet further object of the present invention comprehends the permanent association of the washer and fastener, as above, by extrusion of axially-extending portions of the foregoing ribs or peripherally projecting portions.

The attainment of the foregoing object, in accordance with the present invention, effects numerous important advantages as a result of the extrusion of the excess of material comprising an axial extension of the washer-engaging rib, which extension not only assures permanence of assembly but, prior to extension, cooperates to facilitate the assembly operation.

Thus, it is an important object of the present invention to utilize the extrusion of peripherally projecting portions of the fastener to effect a correspondingly increased outward deformation of the material in washer-retaining or abutting relationship.

The present invention yet more specifically contemplates the production, in accordance with the foregoing objects, of an assembly comprising a thread-forming fastener having hardened, carburized surfaces for facilitating the thread-forming function, in combination with a preassembled washer of maximum toughness and locking efficiency. To this end, the lock washer is desirably free from appreciable surface carburization.

It is therefore an important object of the present invention to provide a method for permanently associating assemblies, as above, which contemplates the combination of carburization and assembly operations in such an order and under such conditions as relatively condition the assembled parts for a final heat treatment after assembly.

Yet other and further objects of the present invention will be more apparent from the following detailed description when considered in connection with the accompanying drawing, wherein Figure 1 is a side elevational view of an unthreaded fastener having in relative preliminary association therewith a washer of the external tooth type, the washer being shown in transverse vertical section;

Figure 2 is a view taken the same as Figure 1, but showing the elements of Figure 1 after the final extrusion of the fastener threads and the permanent assembly of the parts;

Figure 3 is a detailed sectional view taken on the plane indicated by the line 3—3 of Figure 1;

Figure 4 is a plan view of the washer shown in Figure 1;

Figure 5 is a detailed sectional view of the washer and fastener assembly taken in a plane extending vertically and radially through the crest of one of the extruded abutment portions;

Figure 6 is a side elevational view of an alternative form of fastener blank shown before the formation of the holding threads;

Figure 7 is an identical view of the fastener shown in Figure 6 subsequent to the association of a washer and the formation of threaded sections, the washer being shown in section;

Figure 8 is a sectional view taken on the line 8—8 of Figure 6; and

Figure 9 is a plan view of the washer shown in the assembly of Figure 7.

Referring now to the drawing more in detail, wherein like numerals have been employed to designate similar parts throughout the various views, it will be seen that one embodiment of the present invention contemplates a fastener unit composed of a screw element 10 having a shank 12 and a head 14. The head is provided with the usual clamping surface 16 extending outwardly from the shank or stem 12 for clampingly engaging the upper portion of a lock washer designated by the numeral 18.

The lock washer 18 (Figures 1, 2, 4 and 5) includes an annular, continuous body portion 20 having a plurality of integral, external locking members or prongs 22. The lock washer illustrated, in the present instance, is of the type wherein the prongs are twisted, warped or deflected to provide opposed teeth or biting edges 24 projecting out of the plane of the washer on either side thereof. These teeth are accordingly yieldably adapted for interlocking with the fastener and/or the opposed work surfaces for locking the fastener against retrograde movement.

Attention is particularly directed to the fact that the internal periphery or margin of the washer body is annularly or peripherally undulated, and accordingly provides a plurality of annularly-disposed, inward projections 26 separated by intermediate, alternate recesses or grooves 28.

It should be noted that the screw blank or fastener 10 is provided adjacent the head 14 and just axially beyond the clamping surface 16 with a washer-receiving portion comprising a plurality of axially-extending ribs 30 annularly and peripherally disposed about the shank 12.

As sectionally indicated in Figure 3, the outwardly protruding ribs or splines 30 are complementarily disposed and formed with respect to the inner periphery of the washer, and accordingly receive the washer axially in telescoping relationship when moved axially from the position shown in Figure 1.

It will be obvious, from the foregoing, that the complementary reception of the splines, ribs or projections 30 by the undulating periphery of the washer positively prevents relative rotational movement of the washer upon the fastener.

Particular attention is directed, however, to the arrangement and configuration of the axially-extending peripheral projections 30 which extend axially beyond the lock washer, as at 32, when the washer is disposed in operative relation with respect to the washer-receiving surface, as shown in Figure 2. In other words, the ribs 30 project axially into the thread-receiving region of the fastener shank and, accordingly, are in the path of influence of the thread-forming means during the thread-forming operation.

The present invention more particularly contemplates the formation of a continuous helical thread in accordance with means involving the extrusion, upsetting or flow of material comprising the shank, which step is well exemplified by the well-known thread-rolling process. In accordance with this illustrative method, the threaded shank 12 is subjected to rolling under suitable forming pressures between opposed serrated dies adapted to form a helical thread 34.

Attention is particularly directed to the manner in which the extruding action of the thread-forming operation has provided outward projections or abutments 36 adjacent each of the splines 32. While it has been recognized that the formation of thread sections by extrusion results in the disposition of the thread crests beyond the normal periphery of the unthreaded shank, in accordance with the present invention, the excess of material rendered available for extrusion by the elongated axial disposition of the ribs 30 results in the formation of washer-retaining abutment portions of substantially increased extent and permanence. The abutments 36 not only project peripherally beyond the plane of the thread apices but extend laterally of each rib to effectually close or constrict the peripheral recess between each adjacent rib section.

In accordance with the foregoing, each washer is more positively and permanently retained, while the tolerances of the interassociated portions may vary within a more convenient production range. So, also, as will be evident from a careful consideration of Figures 2 and 5, the extruded retaining abutments are of such axial extent as to assure the fixed association of the washer without the necessity for bringing the thread extruding dies into objectionably close relationship with the assembled washer. That is to say, the extruded material may be shifted axially inwardly of the biting edges or teeth of the washer, where it cooperates to position the central body portion and constrain the washer against undesirable axial looseness.

It is thought pertinent at this time to direct attention to the fact that the axial extensions 32 of the ribs 30 terminate in tapered extremities. It has been found, in accordance with this structure, that the initial association or telescoping of the washer into position over the screw shank is materially facilitated by this structure which effectually cooperates to direct the ribs into the respective complementary recesses 28 of the washer body. This result is of practical value and significance, particularly in the continuous mechanical manufacture of the instant assemblies, wherein mechanical means are employed to axially associate each washer and fastener.

It is to be further noted that the shank of the fastener shown in Figure 2 is provided with a slot 38 extending axially from the extremity of the shank and traversing the threads to provide opposed, yielding, biting edges. While the present embodiment exemplifies one assembly comprising a thread-forming or thread-cutting fastener adapted to tap or form its own threads in a work piece, it will be understood that the invention, in so far as the present preferred aspect is concerned, contemplates the possibility of employing other equivalent tapping construction, such, for example, as the fluted and multifluted shank fasteners known in the art. Slot 38 may preferably be milled subsequent to the rolling step.

I have disclosed, in Figures 6 to 9, the application of the present invention to a screw and washer having modified interengaging portions. More specifically, the axial rib or spline configurations 30 are, in accordance with the present modification, configurated with opposed parallel side walls 40 and an outer peripheral segmental surface 42 whereby each of the individual members approaches the conventional shape of a key or spline.

As in the previous embodiment, the several ribs 30 are annularly disposed about the washer-receiving portion of the shank for reception within complementary recesses 44 in the inner periphery of the washer body. A sufficient number of ribs or protuberances 30 have been provided to insure the desired engagement between the parts of the assembly. It should be noted that the free lower extremity of each of the rib configurations is tapered in both axial and radial directions in the same manner as in the previous, illustrated embodiment. The assembly, after permanent association of the parts as a result of the thread-rolling step, is shown in Figure 7.

Attention is particularly directed to the fact that the present invention is particularly applicable to the formation of the assembly wherein the fastener is metallurgically adapted for the cutting or forming steps inherent in the use of self-tapping thread sections. In accordance with the preferred practice, the fastener shank is conditioned for the desired cutting or forming properties by a carburization and heat treating step preferably comprising quenching and tempering. It will be appreciated, however, that carburization of the washer, and particularly washers of small section, is undesirable and in most instances impractical, resulting, as it does, in a serious loss of inherent flexibility or resilience essential to the locking action of the washer teeth. In other words, the washer must necessarily comprise resilient hardened spring stock, while the cutting or tapping edges of the fastener preferably consist of hard, brittle case.

To the end that assemblies comprising thread-forming fasteners may be manufactured in accordance with the foregoing principles, the present invention contemplates the completion of heat treatment of the fastener at least after the formation of the finished assembly. According to one preferred method, I provide the washers with a carbon-resistant coating, such, for example, as a thin coating of copper, by dipping the washer blanks in a solution of copper sulphate for a time period sufficient to result in a visible coating. After the washer has been associated with the shank and permanently located upon the washer-receiving portions by the extruded abutments 36, the assembly, as an entirety, is subjected to case hardening or carburization in the usual manner, followed by quenching and tempering.

It is important to note that the copper coating effectively resists migration of carbon into the surfaces of the washer, which, as the result of the heat treatment, is rendered tough, flexible and adequately hard to effect a high tooth-locking efficiency, wherein the hardened biting edges are urged into engagement with the work surfaces. The threaded surfaces, on the other hand, are in a carburized heat treated condition.

It will be seen that I have not only provided an improved carburized fastener in combination with a hardened yieldable washer, but have manufactured this product by a process adaptable to mass production methods, necessitating only a single hardening treatment.

I may, alternatively, employ analogous methods falling within the purview of the present invention. Thus, the screw blanks may be carburized before interassociation with the washer and subsequently subjected to steps adapted to result in the foregoing permanent assembly. The assembly is ultimately subjected to hardening in its entirety. Thus, it will be obvious that the parts prior to assembly are conditioned for simultaneous hardening after completion of the assembly step.

From the foregoing, it will be apparent that the present invention provides a simple and effective method of securing lock washers and threaded clamping members in preassembled relation prior to shipment to the ultimate consumer. The positive annular interassociation of the inner marginal portion of the washer and the fastener is sufficient to retain the parts in permanent angular relation, while the extrusion of the protruding portions of the shank provide abutments operative to retain the parts in proper assembled relationship without danger of unauthorized disassembly.

It should be noted that the resulting assembly is manually manipulatable for initial insertion or starting of the fastener in the work piece whether grasped by the washer or fastener. Accordingly, relatively large washers may be employed, as illustrated in the figures, without materially affecting the normal speed of assembly.

The positive peripheral interengagement of the assembled parts render the invention adaptable to use with hardened fasteners of the thread-forming type, wherein locking efficiency with the hardened clamping surfaces of the fastener would be otherwise seriously impaired.

By having the complementary portions of the shank and washer constructed and arranged as described herein, these parts may be readily axially associated for assembling purposes. By having the interengaging parts relatively tapered in the direction of approach, the mass production assembly is expedited and facilitated.

It will be understood that, in accordance with the present invention, the material extruded as a result of the thread-forming step is always operative to positively retain the washer in spite of a relatively wide variation in the internal margin of the washer. That is to say, the extruded abutments extending substantially outwardly beyond the crest of the thread are operable to prevent axial displacement of a washer having inner marginal configuration which might otherwise pass over the thread crests, thus rendering available increased ease of association of the parts.

The term "extrusion" as used in the present application is intended to cover those steps involving the flow of metal outwardly from the surface of the fastener shank, of which the so-called thread-rolling or thread-extrusion process is one example, as is well known. This step involves the application of external pressure at spaced points by a thread-rolling die to force certain of the surface material inwardly with the result that the adjacent portions flow outwardly to accommodate the internal displacement. As thus defined, the term includes such steps as swaging, which involves such outward flow of material.

Obviously, the invention is not limited to the specific structural arrangement disclosed herein, but is capable of other modifications and changes without departing from the spirit and scope of the invention.

The invention is hereby claimed as follows:

1. A preassembled screw and washer including a stem having an extruded thread and formed with a head, said head presenting a clamping surface extending laterally outwardly, said stem having a lock washer receiving portion adjacent said clamping surface, outwardly protruding means formed on the lock washer receiving portion, said protruding means extending axially beyond said washer receiving portion and terminating in an outwardly extruded portion operable to prevent axial displacement of the lock washer.

2. A preassembled screw and lock washer including a stem having an extruded thread and formed with a head, said head presenting a clamping surface extending laterally outwardly, said lock washer including a body portion having resilient projecting teeth adapted to bite into the work, said stem having a lock washer receiving portion adjacent said clamping surface, a radially extending rib formed on the lock washer receiving portion, said rib extending axially beyond said washer receiving portion and terminating in an outwardly extruded portion operable to prevent axial displacement of the lock washer.

3. A preassembled screw and washer including a stem having an extruded thread and formed with a head, said head presenting a clamping surface extending laterally outwardly, said stem having a washer receiving portion adjacent said clamping surface, outwardly protruding means formed on the washer receiving portion, said protruding means extending axially beyond said washer receiving portion and terminating in an outwardly extruded portion operable to prevent axial displacement of the washer, said washer being disposed on said washer receiving portion and having a complementary, inner peripheral margin peripherally interengageable with said protruding means for preventing relative rotation of the washer.

4. A preassembled screw and washer including a stem having an extruded thread and formed with a head, said head presenting a clamping surface extending laterally outwardly, said stem having a lock washer receiving portion adjacent said clamping surface, a plurality of spaced, outwardly protruding means annularly disposed about the periphery of the stem at said lock washer receiving portion, said protruding means extending axially beyond said washer receiving portion and terminating in outwardly extruded abutments extending radially beyond the inner periphery of the washer operable to prevent axial displacement of the lock washer.

5. A preassembled screw and washer including a stem having an extruded thread and formed with a head, said head presenting a clamping surface extending laterally outwardly, said stem having a washer receiving portion adjacent said clamping surface, a plurality of spaced, radially projecting ribs annularly disposed about the periphery of the stem at said washer receiving portion, said ribs extending axially beyond said washer receiving portion and terminating in outwardly extruded abutments extending radially beyond the inner periphery of the washer and operable to prevent axial displacement of the washer.

6. A preassembled screw and washer including a stem having an extruded thread and formed with a head, said head presenting a clamping surface extending laterally outwardly, said stem having a lock washer receiving portion adjacent said clamping surface, outwardly protruding means formed on the lock washer receiving portion, said protruding means extending axially beyond said washer receiving portion and terminating in an outwardly extruded portion operable to prevent axial displacement of the lock washer.

7. A preassembled screw and lock washer including a stem having an extruded thread and formed with a head, said head presenting a clamping surface extending laterally outwardly of the stem, said lock washer including a body portion having resilient projecting teeth adapted to bite into the work, said stem having a lock washer receiving portion adjacent said clamping surface, a plurality of spaced, protruding ribs peripherally disposed on the stem adjacent said clamping surface, said ribs extending axially beyond said washer receiving portion and terminating at said thread in extruded abutments extending outwardly beyond the crests of said extruded thread and operable to prevent axial displacement of the lock washer.

8. A preassembled screw and washer including a stem having an extruded thread and formed with a head, said head presenting a clamping surface extending laterally outwardly of the stem, said stem having a lock washer receiving portion adjacent said clamping surface, a plurality of spaced, protruding ribs peripherally disposed on the stem adjacent said clamping surface, said ribs extending axially beyond said washer receiving portion and defining spaced, axially extending, peripheral recesses therebetween, said ribs terminating at said thread in extruded abutments projecting laterally and operable to restrict axial access to the recesses.

9. A preassembled screw and washer including a stem having an extruded thread and formed with a head, said head presenting a clamping surface extending laterally outwardly, said stem having a washer receiving portion adjacent said clamping surface, said washer being disposed upon the washer receiving portion, a plurality of peripherally spaced, protruding ribs on the washer receiving portion and defining intermediate peripheral channels, said ribs extending axially beyond said washer receiving portion and being traversed by the extruded thread to provide an extruded abutment projecting outwardly beyond the crest of the extruded thread and operable to prevent axial displacement of the washer.

10. A preassembled screw and lock washer including a stem having an extruded thread and formed with a head, said head presenting a clamping surface extending laterally outwardly, said stem having a lock washer receiving portion adjacent said clamping surface, said lock washer being disposed upon the lock washer receiving portion and including a body portion having resilient locking teeth adapted to bite into the work, a plurality of peripherally spaced, protruding ribs on the lock washer receiving portion and defining intermediate peripheral channels, said ribs extending axially beyond said washer receiving portion and being traversed by the extruded thread to provide an extruded abutment projecting outwardly beyond the crest of the extruded thread and operable to prevent axial displacement of the lock washer, portions of said abutment extending laterally of said protruding ribs to bar the entrance to the intermediate channels.

11. A preassembled screw and washer including a stem having an extruded thread and formed with a head, said head presenting a clamping surface extending laterally outwardly, said stem having a lock washer receiving portion adjacent said clamping surface, said lock washer being disposed upon the lock washer receiving portion and including a body portion having resilient locking teeth adapted to bite into the work, a plurality of peripherally spaced, protruding ribs on the lock washer receiving portion and defining intermediate peripheral channels, said lock washer having an inner peripheral margin formed for complementary engagement with said plurality of ribs, said ribs extending axially beyond said washer receiving portion and being traversed by extruded threads to provide extruded abutments integral with the ribs and operable to prevent axial displacement of the lock washer.

12. A preassembled screw and lock washer including a stem having an extruded thread and formed with a head, said head presenting a clamping surface extending laterally outwardly, said stem having a lock washer receiving portion adjacent said clamping surface, said lock washer being disposed upon the lock washer receiving portion and including a body portion having resilient locking teeth adapted to bite into the work, a peripheral, outwardly protruding rib on the lock washer receiving portion and extending axially beyond said washer receiving portion, said rib terminating in an integral, outwardly extruded abutment contiguous with the extremity of said threaded portion, said threaded portion having a carburized surface, said lock washer being substantially free from surface carburization and both the washer and the fastener being in hardened condition.

13. A method of forming a fastener and lock washer unit wherein the lock washer is associated permanently with a clamping surface on the fastener, which comprises providing a fastener blank having a headed stem with an axially extending, outwardly protruding projection on the peripheral surface of the stem adjacent the head, operatively associating a washer with said stem in the vicinity of said head, and subjecting the surface of said shank to a thread rolling step over an axial portion including said protruding projection to extrude the excess material thereof outwardly beyond the inner periphery of the washer for permanently preventing axial displacement of the lock washer.

14. A method of forming a fastener and lock washer unit wherein the lock washer is associated permanently with a clamping surface on the fastener, which comprises providing a fastener blank having a headed stem with an axially extending, outwardly protruding projection on the peripheral surface of the stem adjacent the head, operatively associating therewith a lock washer having a complementary, inner-marginal configuration interengageable against relative rotation and subjecting said shank, including portions of said protruding projection disposed axially beyond the lock washer to a thread extrusion process to extrude excess material of the rib outwardly beyond the inner periphery of the washer for permanently preventing axial displacement of the lock washer.

15. A method of forming a fastener and lock washer unit wherein the lock washer is associated permanently with a clamping surface on the fastener, which comprises providing a fastener blank having a headed stem with an axially extending, outwardly protruding projection on the peripheral surface of the stem adjacent the head, operatively associating therewith a lock washer having a complementary, inner-marginal configuration interengageable against relative rotation and subjecting said shank, including portions of said protruding projection disposed axially beyond the lock washer to a thread extrusion process to extrude excess material of the rib outwardly beyond the inner periphery of the washer for permanently preventing axial displacement of the lock washer, and subjecting the assembly to a hardening operation.

16. A method of forming a fastener and lock washer unit wherein the lock washer is associated permanently with a clamping surface on the fastener, which comprises providing a fastener blank having a headed stem with an axially extending, protruding projection formed on the surface thereof adjacent the head, operatively associating with said stem in the vicinity of said head a washer having a carbon resistant protective coating, subjecting a portion of the surface of said shank, including a portion of said projection, to a thread rolling step to extrude the excess material of the projection outwardly beyond the inner periphery of the washer, subjecting the assembled unit to a carburization step and to hardening whereby the entire assembly is hardened and the fastener only is carburized.

17. The method of permanently assembling a fastener and washer unit comprising a fastener blank having a headed stem with an axially extending outwardly protruding projection on the stem in the vicinity of the head and a washer located on the stem in clamping juxtaposition to the head which comprises subjecting the surface of said stem to a thread-rolling step over an axial portion including said protruding projection to cause the excess material thereof to flow outwardly beyond the inner periphery of the washer for permanently preventing axial displacement of the washer.

18. The method of permanently assembling a washer upon a shank of a headed fastener having a clamping surface adapted to coact with the washer which comprises subjecting the surface of said shank including a projecting protuberance on said shank to a thread-rolling step to cause the surface material to flow outwardly beyond the inner periphery of the washer for permanently preventing axial displacement thereof.

19. A preassembled screw and lock washer including a stem having an extruded thread and formed with a head, said head presenting a clamping surface extending laterally outwardly, said lock washer including a body portion having resilient projecting teeth adapted to bite into the work, said stem having a lock washer receiving portion adjacent said clamping surface and a plurality of circumferentially spaced annularly disposed extruded elements projecting from the surface of said stem and extending axially beyond said lock washer receiving portion, said extruded elements extending outwardly beyond the inner periphery of the washer and being operably disposed in a substantially flat plane to resist tilting of the washer.

CARL G. OLSON.

CERTIFICATE OF CORRECTION.

Patent No. 2,270,813. January 20, 1942.

CARL G. OLSON.

It is hereby certified that error appears in the printed specification of the above numbered patent requiring correction as follows: Page 4, first column, lines 5, 7 and 11, claim 1, strike out the word "lock"; lines 43 and 71, and second column, lines 23 and 74, claims 4, 6, 8 and 11 respectively, before "washer" insert --lock--; same page, first column, line 46, claim 4, after the comma and before "said" insert --said lock washer including a body portion having resilient projections adapted to bite into the work,--; line 74, and second column, line 27, claims 6 and 8 respectively, after the comma and before "said" insert --said lock washer including a body portion having resilient projecting teeth adapted to bite into the work,--; page 5, second column, line 66, claim 19, for "beyonl" read --beyond--; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.